US010641676B1

(12) United States Patent
Cruz (10) Patent No.: US 10,641,676 B1
(45) Date of Patent: May 5, 2020

(54) METHOD AND APPARATUS FOR TRACING SEWER CONNECTIONS WITH RFID PIT TAGS

(71) Applicant: Jason Cruz, Philadelphia, PA (US)

(72) Inventor: Jason Cruz, Philadelphia, PA (US)

( * ) Notice: Subject to any disclaimer, the term of this patent is extended or adjusted under 35 U.S.C. 154(b) by 380 days.

(21) Appl. No.: 15/338,427

(22) Filed: Oct. 30, 2016

(51) Int. Cl.
*G01M 3/20* (2006.01)
*G06K 7/10* (2006.01)
*G01V 3/12* (2006.01)

(52) U.S. Cl.
CPC ............. *G01M 3/20* (2013.01); *G01V 3/12* (2013.01); *G06K 7/10425* (2013.01)

(58) Field of Classification Search
CPC ........ G01M 3/20; G01V 3/12; G06K 7/10425
USPC .......................................... 73/49.1
See application file for complete search history.

(56) References Cited

U.S. PATENT DOCUMENTS

| 4,911,012 A | * | 3/1990 | Ziska ................. G01V 1/001 367/120 |
| 5,790,476 A | * | 8/1998 | Stenstrom ............ E03F 7/00 367/120 |
| 6,241,028 B1 | | 6/2001 | Bijleveld et al. |
| 7,836,760 B2 | * | 11/2010 | Saylor ............... G01D 9/005 73/195 |
| 8,172,007 B2 | | 5/2012 | Dolman et al. |
| 8,397,810 B2 | | 3/2013 | Verret |
| 8,881,809 B2 | | 11/2014 | Verret et al. |
| 9,488,046 B2 | * | 11/2016 | Purkis ................ E21B 47/122 |

(Continued)

FOREIGN PATENT DOCUMENTS

| GB | 2310719 A | * | 9/1997 | ............... E03F 7/00 |
| JP | 2007-245280 | * | 1/2007 | |
| JP | 5244569 B2 | * | 7/2013 | |

OTHER PUBLICATIONS

Fuller, S. A., Henne, J. P., Seals, J., & Mudrak, V. A. (2008). Performance of commercially available passive integrated transponder (PIT) tag systems used for fish identification and interjurisdictional fisheries management. North American Journal of Fisheries Management, 28(2), 386-393.

(Continued)

*Primary Examiner* — Marrit Eyassu
(74) *Attorney, Agent, or Firm* — Joseph E. Maenner; Maenner & Associates, LLC (57) ABSTRACT

A method and apparatus for tracing sewer connections with RFID PIT tags consists of using at least one radio frequency identification (RFID) passive integrated transponder (PIT) tag embedded within a protective outer covering, and at least one RFID reader and antenna system to trace the flow of a fluid within a plumbing system, sewer lateral pipe, sanitary or storm sewer system. The RFID PIT tag and protective outer covering are introduced in one point within the plumbing system, sewer lateral pipe, sanitary or storm sewer system, such as by flushing a toilet. Subsequent collection, or detection of the RFID PIT tag at another location within a sewer lateral pipe, sanitary or storm sewer system is used to establish the presence of a hydraulic connection between the introduction and collection or detection points. The method is useful to identify whether a plumbing system or sewer lateral pipe is properly connected to a sewer system without the need to actively observe the presence of a visual tracing aid such as dye.

14 Claims, 4 Drawing Sheets

(56) References Cited

U.S. PATENT DOCUMENTS

| | | | |
|---|---|---|---|
| 2006/0000604 A1 | 1/2006 | Jenkins et al. | |
| 2006/0109131 A1 | 5/2006 | Sen | |
| 2008/0277594 A1* | 11/2008 | Wagner | G06K 7/10178 |
| | | | 250/432 PD |
| 2009/0211754 A1* | 8/2009 | Verret | E21B 47/10 |
| | | | 166/250.12 |
| 2010/0139386 A1 | 6/2010 | Taylor | |
| 2014/0306809 A1* | 10/2014 | McIntyre | G01M 3/005 |
| | | | 340/10.42 |
| 2015/0027706 A1* | 1/2015 | Symms | E21B 34/066 |
| | | | 166/289 |
| 2015/0090404 A1 | 4/2015 | Lazarev et al. | |
| 2015/0252652 A1* | 9/2015 | Murdoch | E21B 34/102 |
| | | | 166/250.01 |
| 2015/0324681 A1* | 11/2015 | Mats | G06K 19/07766 |
| | | | 235/492 |

OTHER PUBLICATIONS

Turnipseed, D., & Sauer, V. (2012). Discharge measurements at gaging stations: US Geological Survey Techniques and Methods Book 3, Chapter A8, 87 p. (excerpt only attached).
Smiley, S. "Duck, Duck, . . . RFID?", RFID Insider, Sep. 19, 2016 Atlas RFID Store, Birmingham, AL.

* cited by examiner

METHOD AND APPARATUS FOR TRACING SEWER CONNECTIONS WITH RFID PIT TAGS

CROSS-REFERENCE TO RELATED APPLICATIONS

This application claims the benefit of provisional patent application Ser. No. 62/249,291 filed Nov. 1, 2015 by the present inventor, which is incorporated by reference in its entirety.

TECHNICAL FIELD

The present invention relates to sewer systems, more specifically to testing and tracing of hydraulic connections between sewer systems and components thereof.

BACKGROUND ART

1.) Sewer Systems

Sewer systems provide for the collection and conveyance of sanitary sewage and stormwater runoff. In a modern "separate" sewer system, a private property such as a house usually has one internal plumbing system for collection and conveyance of sanitary waste and wastewater from plumbing fixtures throughout the home. These fixtures may include toilets, showers, bathtubs and lavatories; dishwashers and kitchen sinks; laundry and utility sinks, internal drains and other fixtures. These fixtures and the plumbing system draining them are connected to a sanitary sewer by a sanitary sewer lateral pipe. Properly designed and maintained sanitary sewer systems convey sanitary waste to wastewater treatment plants where pollutants are removed before discharging to surface waters (e.g., rivers, streams, lakes, estuaries and coastal areas) or groundwater.

A typical house may also have another, separate plumbing system for collection and conveyance of rain water (or "stormwater") and snowmelt runoff from roofs and other impervious surfaces. Stormwater plumbing systems and drainage infrastructure such as gutters and downspouts may be connected to a separate storm sewer system via a storm sewer lateral pipe. Properly designed stormwater drainage and storm sewer systems collect and convey stormwater runoff away from roofs, roads and other impervious surfaces to reduce the likelihood of local flooding. Stormwater management policies vary and in some localities storm sewers discharge directly to surface waters; in other areas storm sewers may be designed to convey stormwater runoff to a stormwater management system.

Properly designed and maintained separate sewer systems are effective at protecting public health and the environment. Unfortunately defects and improper connections may be present in and among plumbing systems, sewer lateral pipes and sewer systems. One type of defect is known as "cross-connection", an undesirable condition in which there is a leak or hydraulic connection between components of the sanitary and storm sewer systems. For example, one or more sanitary sewer lateral pipes may be improperly connected to a storm sewer. Alternatively, storm sewer lateral pipes or other stormwater drainage infrastructure may be improperly connected to a sanitary sewer system. Sanitary sewage disposed in a home with a cross-connected plumbing system may not be conveyed to a wastewater treatment plant and may contaminate a storm sewer system that is not designed for sanitary sewage. Contaminated stormwater and sanitary sewage may then be released into the environment, causing pollution of surface waters or groundwater aquifers. Sewer lateral pipe and sewer system defects can thus cause or contribute to bacterial contamination and impairment of water supply uses of surface water and groundwater and may also impair recreational uses of surface waters.

The improper connection of storm sewer lateral pipes or other stormwater drainage infrastructure to a sanitary sewer system is also problematic. Sanitary sewers are usually built with smaller hydraulic capacity than storm sewers. As stormwater flow takes up space within the sanitary sewer system, the capacity of the sanitary sewer system to convey sanitary waste decreases, potentially resulting in basement backups or sanitary sewer overflows. Even if the additional stormwater flow can be conveyed without overflowing, treatment costs for wastewater treatment plants can increase, as the facility will have to treat a greater amount of flow than if only sanitary waste is collected and conveyed to the treatment works.

2.) Sewer System Testing

Due to the potential for pollution and other problems that sewer system defects can cause, owners and operators of separate sewer systems such as municipalities and regional authorities may need to inspect and test sanitary and storm sewer lateral pipes to verify that they are connected to the proper sewers and free from defects. Periodic inspections of sewer systems, including privately owned sanitary and storm sewer lateral pipes, may be required as a condition of permits issued by a state or federal regulator to the operator of the sewer system. Furthermore, ordinances in some localities may require a certificate of sewer lateral inspection be obtained for real estate transactions. Sewer lateral pipes must be inspected in order to certify that sewer lateral pipes on the subject property are properly connected and in good condition before property can be transferred.

Inspection of separate storm and sanitary sewer lateral pipes may also be initiated by a sewer system owner or operator based on routine checks of storm sewers or complaints from the public. Investigations may be required when there is evidence of illicit dry weather flow or when other indicators of sanitary sewage contamination are observed in storm sewers or at storm sewer outfalls. Storm sewer outfalls are often located along banks of rivers and streams where stormwater may be discharged into surface waters. Owners and operators of separate sewer systems, such as municipalities and regional authorities may also need to inspect and test sanitary and storm sewer laterals concerning the presence of infiltration and inflow (I&I) into the sanitary sewer system.

3.) Dye Testing

One method of testing and tracing sewer connections known in the art is the introduction of a visible dye in the plumbing system or other access point along the lateral pipe and visual inspection of the flow in a downstream observation point in the sewer system—such as a manhole—for the presence or visual evidence of dye. The dye testing process is labor-intensive as it usually requires at least two persons. One person typically introduces the dye into the system under investigation while another person must be physically present at a downstream observation location to observe the dye. Each dye test consists of two distinct physically- and temporally-linked events—the introduction of the dye, and the observation of the dye thereafter. This feature of the dye testing method is disadvantageous, making it a time-consuming affair to sequentially test multiple fixtures within a property and impractical to conduct tests of multiple properties or locations within the same sewer system network simultaneously.

Due to the "time-of-travel", or the amount of time necessary for the dye to be conveyed between the plumbing fixture or other introduction point and the downstream observation point, it may be necessary to wait several minutes to determine the result of a dye test. It may also be necessary to wait several minutes between multiple dye tests to allow dye to disperse and ensure the reliability and independence of each test result. It may also be necessary for the persons conducting the test to remain in contact with one another and keep accurate time records in order to record the outcome of the tests conducted. Due to the temporal nature of the test procedure and the need to remain in communication, the closest downstream manhole or access point is often used as the observation point for each dye test.

Selecting observation points physically close to the property or sewer system being tested necessitates opening multiple manholes when testing multiple properties along a street as the work progresses. Moving the work zone and opening additional manholes or other access points can be time consuming and labor-intensive, as manhole covers are often found to be jammed with paving materials and debris. Workers may incur the dangers of using striking, prying and lifting tools to open additional manholes. Ladders, wet conditions and sewer gases such as hydrogen sulfide and methane are also potential hazards for observers that may enter the confined space of a manhole to make observations for the presence of dye.

Another safety disadvantage of dye testing is that suitable observation points such as manholes are often located within roads or other areas subject to vehicle or foot traffic. Opening manholes to make observations for the visual evidence of dye thus often requires securing a safety zone around the manhole to prevent persons or objects from falling into the manhole. Furthermore, at any time when a person is required to occupy an observation position in a road or other location where vehicles are operated, there exists the danger of the worker being struck by a vehicle. Closing lanes or entire roads to safely accommodate dye testing observers can cause inconvenience for motorists and may impede emergency vehicles.

In addition to the safety and time-of-travel disadvantages of dye testing, the dilution of dye by base wastewater flow in sanitary sewers requires that a relatively large amount of dye be used in order to provide definitive visual evidence of the presence of dye. Environmental conditions such as bright daylight can cause large differences in contrast between the ambient outdoor environment and the sewer system being tested, which is typically much darker. Flashlights are often used to illuminate the sewer observation point, but on bright days it may be difficult to see the dye unless a relatively large quantity of dye is used. Although dyes used for sewer system testing are typically non-toxic, dyes are expensive and have other undesirable characteristics such as the potential for staining surfaces and the unintended or unanticipated observation of dye at other non-testing locations.

4.) Camera Inspection and Advanced Methods of Sewer Inspection

Camera inspection is another type of testing known in the art that is used to inspect plumbing systems, sewer lateral pipes and sanitary and storm sewers. A variety of models of cameras are available for use in video inspection of sewer system components, from simple "push" cameras to more elaborate motorized and robotic cameras. Cameras can provide visual evidence of many types of sewer system defects but the use of cameras requires a suitable insertion point and skilled person to operate the camera and interpret the display or review recorded video footage of the inspection. Cameras can be impeded by pipe geometry, various types of pipe defects, or obstructions caused by tree roots or other debris.

In addition to dye testing and camera inspection, there are many other methods known in the art for deploying robots, sensors and other electronic monitoring devices in flowing fluid applications, such as force water and sewer mains, gas and oil pipelines, and wellbores. Such devices may be tethered or untethered, self propelled or passive. For example "Smart pigs" are a class of devices that are used to perform maintenance, detect leaks and monitor data within pipelines. These advanced technologies tend to require specialized equipment and skilled operators and are currently prohibitively expensive for use in plumbing system and sewer lateral pipe investigations.

5.) Disadvantages of Current Sewer Inspection Methods

As the need to inspect and test sewer lateral connections grows with tightening environmental regulations and deterioration of older sewer systems, owners and operators of sewer systems may find themselves needing to test a large number of sewer connections over a large geographical service area. When performing tests of each individual property plumbing system or sewer lateral pipe within a large area under investigation, it would be desirable to be able to test multiple fixtures, plumbing systems and sewer lateral connections from multiple properties in an arbitrary sequence rather than performing one test at a time as is the case with dye testing and camera inspection. It is possible to use different colors of dye to marginally increase the number of fixtures that can be tested concurrently, but this approach is limited by the number of colors of available dye that can be discriminated by an observer and is still subject to the disadvantages described above in terms of sequential testing.

It would also be very desirable to be able to choose a single downstream monitoring location or small set of monitoring locations for the observation of test results. It also would be desirable for test results to be determined automatically by electronic means rather than by an active human observer and for test results to be transmitted in near-real time to a server by a telemetry system. Neither dye testing nor camera inspection can yield the type of test results that can be quickly and readily integrated into an automated information technology workflow.

6.) Electronic Tagging and Tracking

A variety of methods for tagging and subsequent identification of objects are known in the art and used extensively for tracking cargo, articles in trade, livestock and domestic animals. A common type of electronic identification tag well-known in the art is the radio frequency identification (RFID) passive integrated transponder (PIT) tag, or "RFID PIT tag". A typical RFID PIT tag consists of a silicon computer chip, capacitor, and wound copper antenna enclosed in a biologically inert glass capsule. RFID PIT tags may be used with an RFID reader and antenna system, typically comprising an RFID PIT tag reader, antenna, datalogger, power supply, appurtenant wiring, and optionally, a telemetry system. The RFID reader and antenna system can be used to interrogate, or "read" RFID PIT tags within the effective reading range of the antenna. When a compatible RFID PIT tag comes within range, a current is induced in the RFID PIT tag by the antenna, and an identification sequence, or code, stored on the RFID PIT tag chip can be transmitted to and read by the reader. The identification sequence encoded in each tag can be used to uniquely identify each RFID PIT tag from a known database of tag identification codes. RFID PIT tags are used extensively for identification of domestic livestock and pets as well as hatchery and farm-raised fish. For example, hatchery-raised migratory fish tagged with RFID PIT tags may be released into the natural environment and then later identified when they are caught by fishermen or researchers. Tagged hatchery-raised fish may also be identified when they pass by RFID reader and antenna systems installed within natural and man-made waterways such as stream channels, fish ladders and other fish passage facilities.

The distance at which a given RFID PIT tag can be interrogated and read depends heavily on the size and type of antennas used in the RFID PIT tag and in the RFID reader and antenna system. Several types of antenna designs and deployment methods are used in the art for application of RFID technology for building access, inventory control, manufacturing, raising and processing of livestock; and tracking of fish and wildlife. Typical RFID reader and antenna systems used for building entry or identification of domestic animals may only be capable of interrogating and reading tags at a distance of a few centimeters. The more powerful specially designed RFID reader and antenna systems used in fish monitoring applications may be capable of interrogating and reading 12.2×2.1 mm RFID PIT tags embedded in the body cavity of swimming fish with detection distances of 50 cm or more.

7.) Fluid Flow Measurement by Float or Entrained Body

The flow of water or other fluid movement in a confined pipe or open channel may be measured by tracking and recording the movement of a floating or suspended object (drogue, or body) floating within or entrained by the flowing fluid to be measured over a given distance. Numerous methods are known in the art for the measurement of velocity or discharge of a flowing fluid by tracking objects within the flowing fluid. Floating or neutrally buoyant objects (bodies) such as oranges or specially weighted floating rods have been used to measure flow in rivers. Positively buoyant objects are generally preferred for flow measurement due to the propensity of denser objects to become trapped or drag on the bottom of the channel to be measured. When a floating or entrained object is used for flow measurement a coefficient or adjustment factor may be used to compensate for the fact that the fluid flowing nearer the surface will be flowing at a higher velocity than the fluid nearer the bottom or sides of the channel. The use of floating and entrained object tracking methods is relatively uncommon, however, due to the availability of more advanced methods known in the art such as acoustic Doppler velocimetry.

8.) Conclusion

From the preceding information, it is clear that there are significant disadvantages to existing methods for testing plumbing systems, sewer lateral pipes and sewer systems under some test conditions and for certain testing objectives.

SUMMARY OF THE EMBODIMENTS

In one or more aspects, the embodiments provide effective, low cost methods for testing and tracing connections within a plumbing system, sewer lateral pipe, sanitary or storm sewer system with RFID PIT tags. Waterproof antenna designs commonly used for fish hatcheries and fish monitoring are commercially available and readily adaptable to sewer monitoring conditions. Similarly, weatherproof computerized RFID PIT tag reader systems are readily available and suitable for deployments within manholes or other access points within a sewer system. Evidence of a hydraulic connection between two points in a plumbing system, sewer lateral pipe, sanitary or storm sewer system can be established by releasing, or introducing an RFID PIT tag at one point within a plumbing system, sewer lateral pipe, or sewer system and detecting the presence of the RFID PIT tag by interrogating and reading the tag at a second point within a sewer lateral pipe, sanitary or storm sewer system with an RFID PIT tag reader.

1.) Protective Outer Covering

Due to its physical characteristics, an RFID PIT tag may be enhanced by a protective outer covering to promote entrainment and movement in the fluid flowing within a plumbing system, sewer lateral pipe, or sewer system. Protective outer coverings may be made from a variety of materials to suit the type of plumbing system, sewer lateral pipe, or sewer system being tested and the conditions and objectives of the test. The detection of an RFID PIT tag embedded within a protective covering as it moves through a plumbing system, sewer lateral pipe, or sewer system is similar to the detection of an RFID PIT tag in the body of a fish swimming through a watercourse equipped with an RFID reader and antenna system.

Paraffin wax is an example of a relatively durable, low cost, hydrophobic, non-toxic material with a low melting point that can be easily cast in molds, alone or in combination with other materials. Raw paraffin wax has a typical density less than 1 g/cm$^3$, making it slightly buoyant in water. When cast in the voids of 13 mm spherical molds containing 12.2 mm×2.1 mm RFID PIT tags, 13 mm RFID PIT tag-containing paraffin wax spheres may be produced. Paraffin wax spheres with these properties are suitable for tracing sewer connections. Density and other physical properties of outer coverings for RFID PIT tags may be modified by compounding paraffin wax with other materials or embedding other materials in the wax while it is in the molten state. For example, silica sand or other materials with density greater than 1 g/cm$^3$ may be incorporated within the wax to increase its density. Alternatively, buoyant materials such as shredded cork, foam, or air voids created by mixing may be incorporated into the wax to decrease its density.

2.) RFID Reader and Antenna System

In order to test a fixture, plumbing system, sewer lateral pipe or sewer system an RFID reader and antenna system is first installed at a suitable location. Individual testing conditions will dictate the most appropriate location to install an RFID reader and antenna system such that RFID PIT tags introduced into the fluid flowing through the sewer system will pass within the effective detection range of the RFID reader and antenna system. Once the RFID reader and antenna system is installed and shown to be effectively interrogating and reading tags in the test monitoring area, testing may commence by introducing one or more RFID PIT tags with a protective covering into the fixture, plumbing system, sewer lateral pipe or sewer system under investigation. If the RFID PIT tag(s) are subsequently interrogated and read by the RFID reader and antenna system, a hydraulic connection between the introduction location and the downstream monitoring location is established.

3.) Advantages

RFID PIT tag tracing offers many operational and logistical advantages over dye testing and camera inspection methods, principally in the areas of material costs, labor costs and occupational health and safety:

1.) An RFID reader and antenna system does not rely on an observer being physically present and conditions being suitable for the visual identification of dye. RFID PIT tags are detected by a properly configured unsupervised RFID reader and antenna system without the need for constant oversight.

2.) Other than the time needed to install the RFID reader and antenna system in the sewer system, there is no need to have a person in the confined space of a sewer system manhole or other access point in order to be able to perform the testing procedure.

3.) Detection of an RFID PIT tag with its unique identification code provides very conclusive evidence for the hydraulic connection between two points, for it can be shown that a discrete physical object, or "token", traveled between the release point and the detection point.

4.) Tests of sewer system connections with RFID PIT tags are not temporally constrained in the manner of dye tests. A plurality of RFID PIT tags may be released within a catchment area tributary to a given monitoring point in the sewer system. Detection of individual RFID PIT tags may occur in any sequence and interpretation of a test result does not rely on the passage of time.

These advantages allow for certain types of testing in a plumbing system, sewer lateral pipe, or sewer system to be conducted more efficiently, at a lower cost for materials and labor, and with a greater certainty in test conclusions than with dye testing or camera inspection.

4.) Protective Outer Covering Materials

Although the paraffin wax material described above is a very suitable protective outer covering for an RFID PIT tag used in tracing sewer connections, for some testing situations it may be favorable to have the RFID PIT tag protected with an outer covering having different physical properties. For example, a particular user, property owner, or third party might object to the use of paraffin wax for testing connections within a sanitary or storm sewer system. Paraffin wax is insoluble in water and relatively durable, making it persistent within the environment of a sewer system or the environment in general. Alternative materials may provide sufficient protection for the RFID PIT tag for the duration of a testing event but more quickly dissolve or disintegrate thereafter.

Therefore, in another embodiment, clay, gelatin or other water soluble or non-persistent materials may be used as a protective covering material for an RFID PIT tag. When released within a plumbing system, sewer lateral pipe, or sewer system, these materials will dissolve or break down within the environment of the plumbing system, sewer lateral pipe, or sewer system if they should become trapped therein, or within the environment of receiving waters should they be released thereto. The density and other physical properties of clay, gelatin or other protective outer covering materials for RFID PIT tags may be modified by compounding with other materials or embedding other materials in the protective outer covering material. For example, silica sand or other materials with density greater than 1 g/cm$^3$ may be incorporated within the protective outer covering material to increase its density. Alternatively, materials such as shredded cork, foam, or air voids may be incorporated in the protective outer covering material to decrease its density.

DESCRIPTION AND OPERATION OF SPECIFIC EMBODIMENTS

Figure 1:
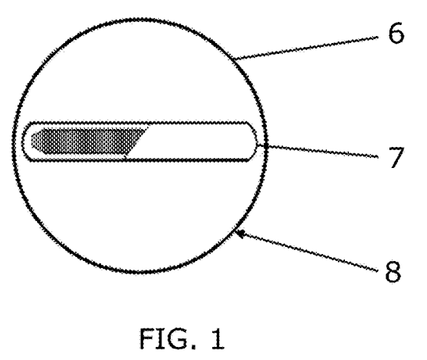
FIG. 1 is a cross-sectional diagram of an RFID PIT tag and protective outer covering in the shape of a sphere.

1.) Method and Apparatus for Testing Sanitary Sewer Connections with RFID PIT Tag As shown in FIG. 1, a protective outer covering (6) of paraffin wax in the shape of a sphere is provided for the protection of an RFID PIT tag (7). The RFID PIT tag is encoded with a unique identification sequence. The RFID PIT tag (7) and protective outer covering (6) compose a bolus, or RFID PIT tag device (8) that is useful for tracing connections in a plumbing system, sewer lateral pipe, or sewer system. The paraffin wax protective outer covering (6) is durable, slightly buoyant, and spherical in shape. These physical properties promote the entrainment and conveyance of the RFID PIT tag device (8) along with the bulk flow of a flowing fluid. The RFID PIT tag device (8) may be used for testing of a plumbing system or sewer lateral pipe under investigation to verify a proper connection between said plumbing system or sanitary sewer lateral and a sanitary sewer system.

Figure 2:
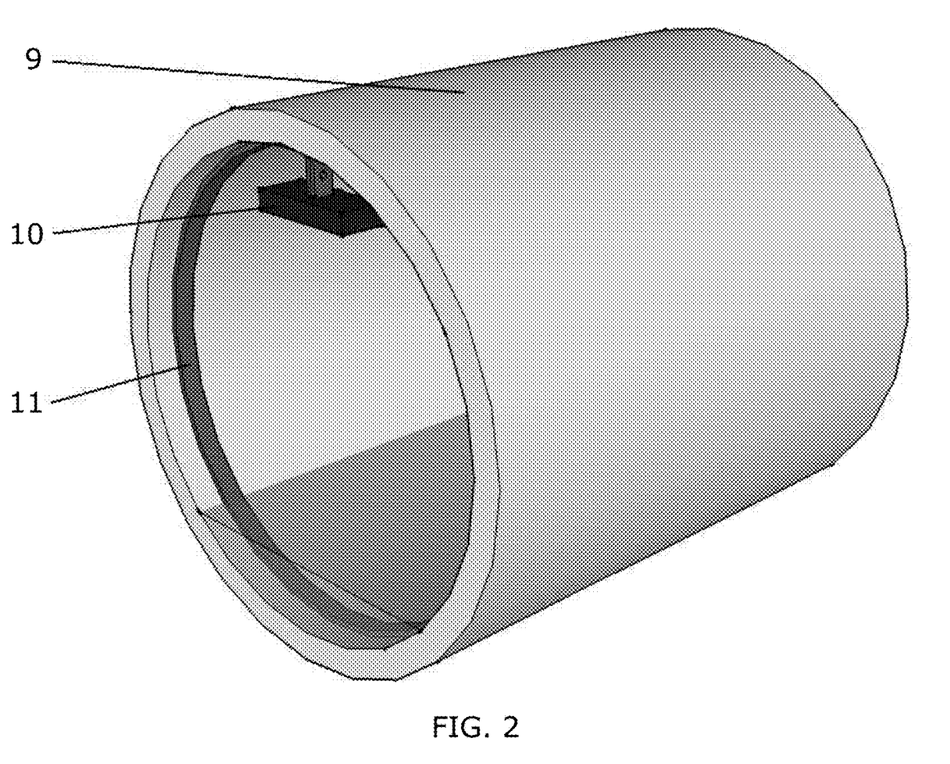
FIG. 2 is a diagram of a sewer pipe segment with RFID antenna installed on an expansion ring bracket.
Figure 3:
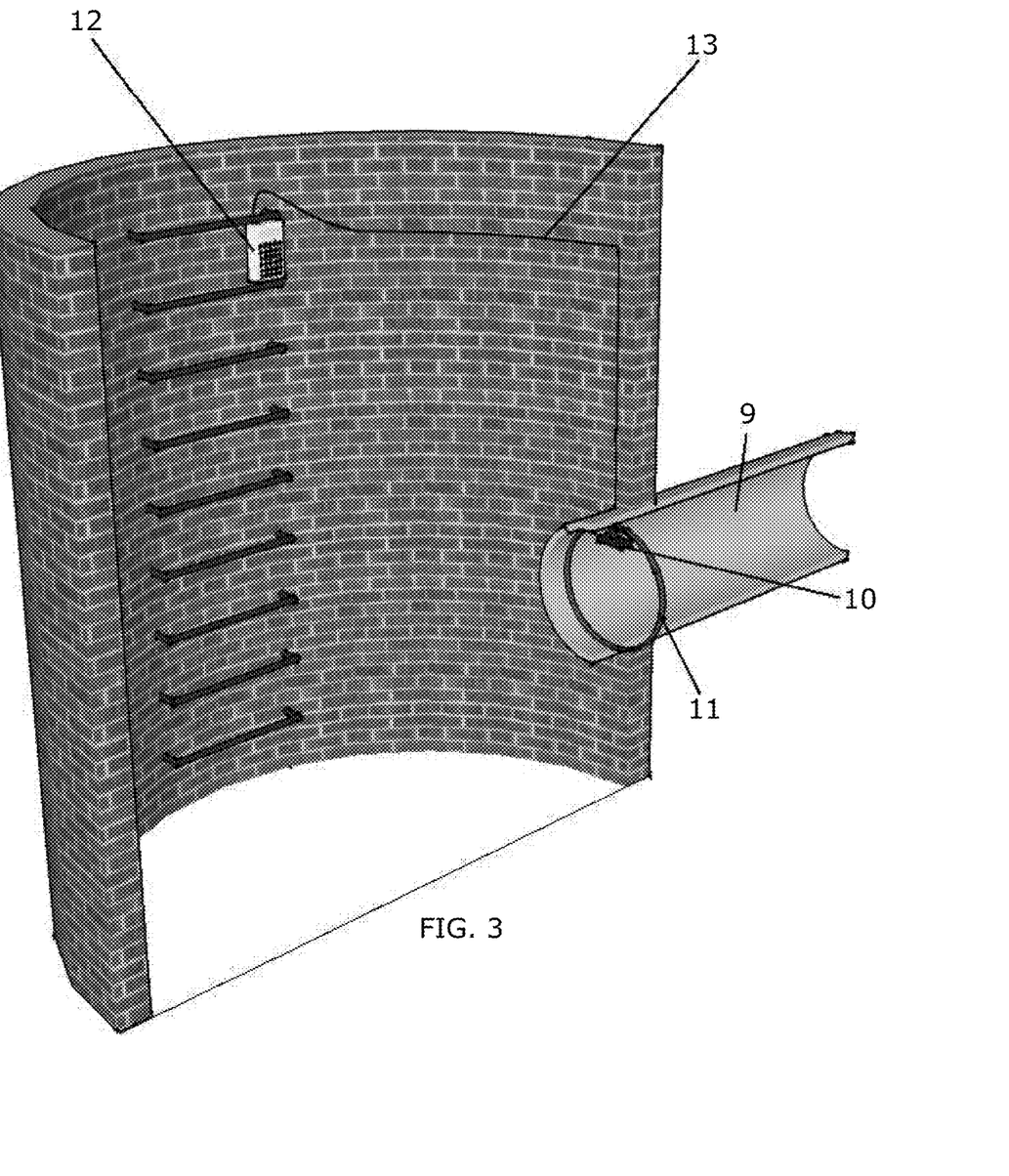
FIG. 3 is a diagram of the interior of a manhole and sanitary sewer pipe connection with an RFID PIT tag reader, antenna cable and RFID antenna installed.

FIG. 2 shows a segment of a sewer pipe (9) and an antenna (10) secured within the pipe by an expansion ring bracket (11). The antenna (10) may be installed at a monitoring point in the sanitary sewer system such that the flow from the sanitary sewer lateral pipe connection being tested will flow by gravity past the monitoring point. The orientation of the antenna (10) within the pipe or the specific type of antenna (10) used may be adjusted to facilitate reliable reading of RFID tag (7) within the pipe. Antennas may be of "pass-by" or "pass-through" design FIG. 3 shows a sewer manhole with a sewer pipe (9) connection. A computerized RFID PIT tag reader (12) is installed within the manhole and connected to the antenna (10) by an antenna cable (13). The RFID PIT tag reader (12) is programmed to detect the presence of any RFID PIT tag (7) that comes within the effective reading range of the antenna (10) and record the identification sequence of each detected RFID tag (7) to internal memory. After one or more tests have been conducted, the information in the RFID PIT tag reader (12) memory is accessed, such as by downloading the data to a laptop computer. A telemetry system may also be used to transmit test data to a server.

Figure 4A:
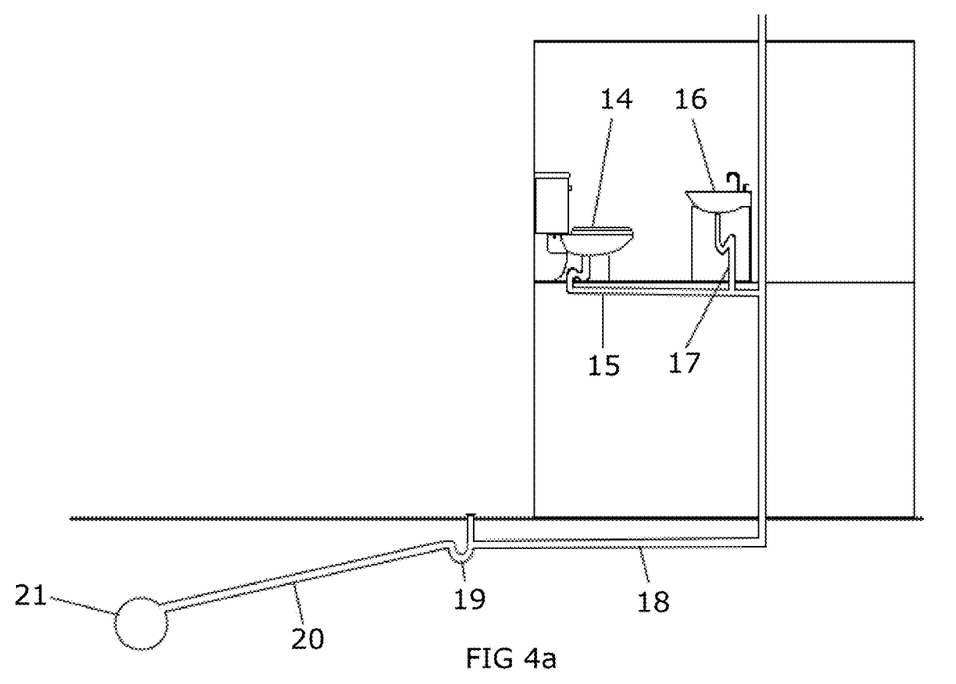
FIG. 4a is a simplified diagram of some components of a house plumbing system and their connection to a sanitary sewer system.

FIG. 4a shows some components of a typical house plumbing system and a connection to a sanitary sewer system. In order to perform a test of whether the plumbing system is properly connected to the sanitary sewer system, the RFID PIT tag device (8) is introduced into the plumbing system by flushing the device in a toilet (14), causing RFID PIT tag device (8) to be transported through a closet waste drain (15) along with the bulk waste fluid flow. Although toilet (14) is the most common type of fixture to be tested, other fixtures or access points may be used to introduce RFID PIT tag device (8) into the plumbing system under investigation.

Referring again to FIG. 4a, the movement of the RFID PIT tag device through the plumbing system may be enhanced by flushing the toilet (14) repeatedly, as well as by opening one or more water faucets at a lavatory (16). Flow from the lavatory waste drain (17) will combine with the flow from the closet waste drain (15) to promote the movement of the test device (8) through the main house drain (18). It may be desirable, though it is not necessary, to open a sanitary sewer vent (19), if present and accessible, to inspect the flow from the main house drain (18) to the sanitary sewer lateral pipe (20). If there are no defects in the plumbing system and the sanitary sewer lateral pipe (20) is properly connected (i.e., not cross-connected) and free from obstructions, the test device (8) will be conveyed through the sanitary lateral pipe to the sanitary sewer (21).

Figure 5A:
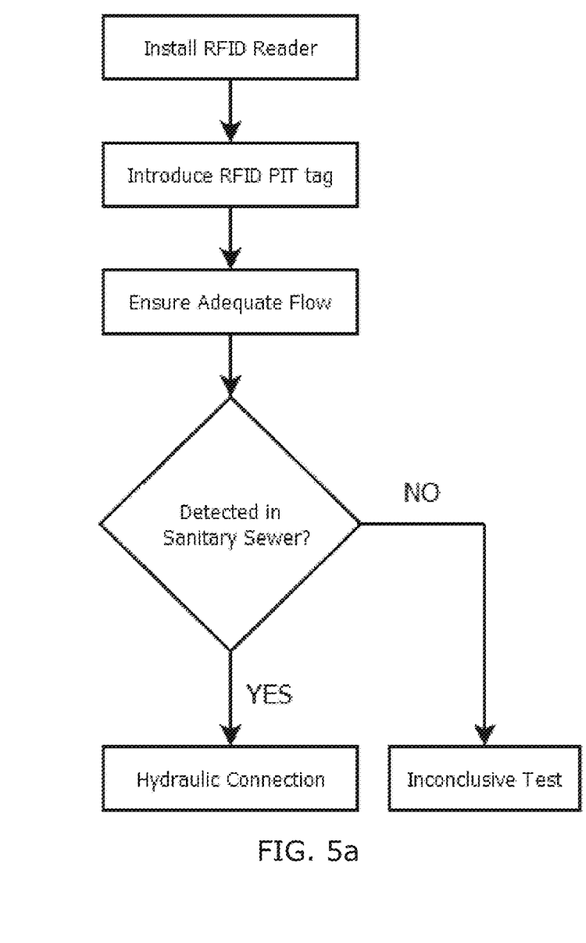
FIG. 5a is a flowchart for the operation of an investigation of connections to a sanitary sewer system as described in one or more embodiments.

FIG. 5a summarizes the operation of a specific embodiment when the system to be tested is a sanitary sewer (21). The results of the test may be described as "positive" if the RFID PIT tag device (8) is detected by the reader (12) and antenna (10) system, as evidenced by the unique identification sequence being recorded in the memory of the RFID PIT tag reader (12). A positive test result provides evidence that the sanitary sewer lateral pipe (20) is properly connected (i.e., not cross-connected) as it can be demonstrated that the RFID PIT tag device (8) was conveyed through the sanitary lateral pipe (20) to the sanitary sewer (21). The results of the test may be described as "inconclusive" if the RFID PIT tag device (8) is not detected by the reader (12) and antenna (10) system. Inconclusive tests may be referred for follow up testing with a different method.

Description and Operation of Alternate Embodiments

2.) Method and Apparatus for Testing Storm Sewer System with RFID PIT Tag

In another embodiment, the RFID PIT tag device (8) is used to perform a screening test to determine whether components of a storm water drainage system, such as storm water inlets, area drains, catch basins, downspouts, foundation drains or other inflow points within a plumbing system, storm sewer lateral pipe or storm sewer system are connected to a particular storm sewer system. The RFID reader (12) and antenna (10) system is installed at a monitoring point in the storm sewer (22) system such that the flow from the storm water drainage system under investigation will flow by gravity past the monitoring point. The RFID PIT tag device (8) is introduced into a stormwater drainage system along with a sufficient quantity of water to promote the movement of the RFID PIT tag device (8) through the stormwater drainage system.

Figure 4B:
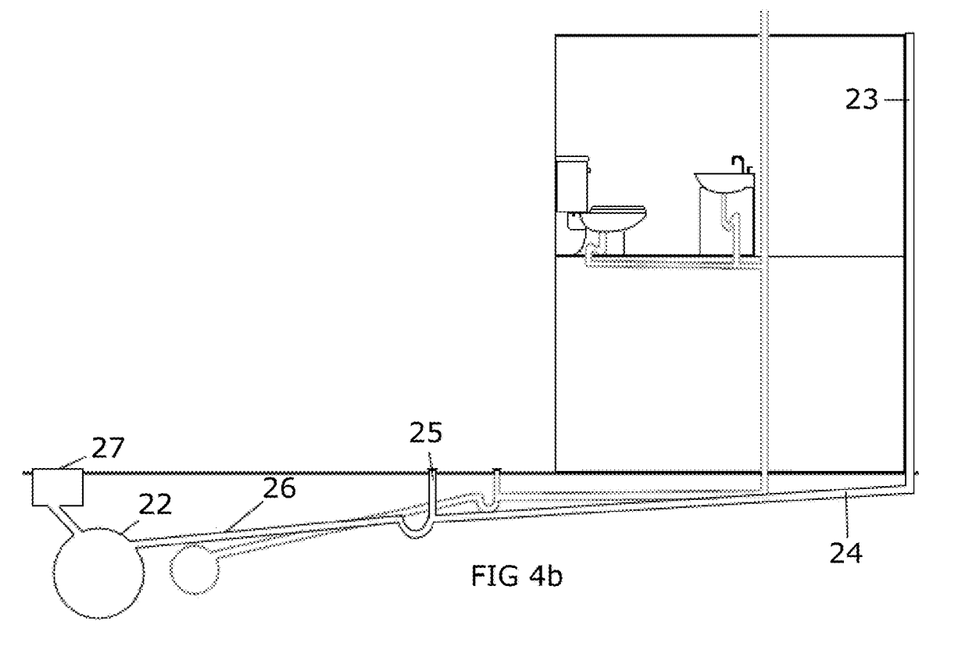
FIG. 4b is a simplified diagram of some components of a house storm water drainage system and their connection to sanitary and storm sewer systems.

FIG. 4b shows some components of a storm water drainage system and storm sewer (22) system, including a downspout (23), storm water drain pipe (24), storm sewer vent (25), storm sewer lateral pipe (26), storm sewer (22), and catch basin (27). The RFID PIT tag device (8) is introduced into the plumbing system, storm sewer lateral pipe or other inflow point, along with a quantity of water, allowing the RFID PIT tag device (8) to move through the storm sewer (22) system along with the bulk fluid flow. If there are no defects in the stormwater drainage system and the storm sewer lateral pipe (26) is properly connected (i.e., not cross-connected) and free from obstructions, the RFID PIT tag device (8) will be conveyed through the stormwater drainage system and storm sewer lateral pipe (26) to the storm sewer (22).

When the system to be tested is a storm sewer (22) the results of the test may be described as "positive" if the RFID PIT tag device (8) is detected by the reader (12) and antenna (10) system, as shown by the unique identification sequence being recorded in the memory of the RFID PIT tag reader (12). A positive test result provides evidence that the storm sewer lateral pipe (26) is properly connected (i.e., not cross-connected) as it can be demonstrated that the RFID PIT tag device (8) was conveyed through the storm sewer lateral pipe (26) into the storm sewer (22). The results of the test may be described as "inconclusive" if the RFID PIT tag device (8) is not detected by the reader (12) and antenna (10) system. Inconclusive tests may be referred for follow up testing with a different method.

3.) Method and Apparatus for Simultaneous Testing of Storm and Sanitary Sewer Systems with RFID PIT Tag In yet another embodiment, storm and sanitary sewers are investigated concurrently. Two RFID reader (12) and antenna (10) system are used to detect at least one RFID PIT tag device (8) as it moves through the sanitary sewer (21) or storm sewer (22). The test procedure is the same as in the previously discussed embodiments, with the exception of a pair of RFID reader (12) and antenna (10) system installed within downstream monitoring points within both the sanitary sewer (21) system and storm sewer (22) system. RFID PIT tag reader (12) and antenna (10) systems in sanitary and storm sewers are operated independently of one another and are mutually configured to eliminate the "false positive" detection of an RFID PIT tag device (8) in a different sewer system.

Figure 5B:
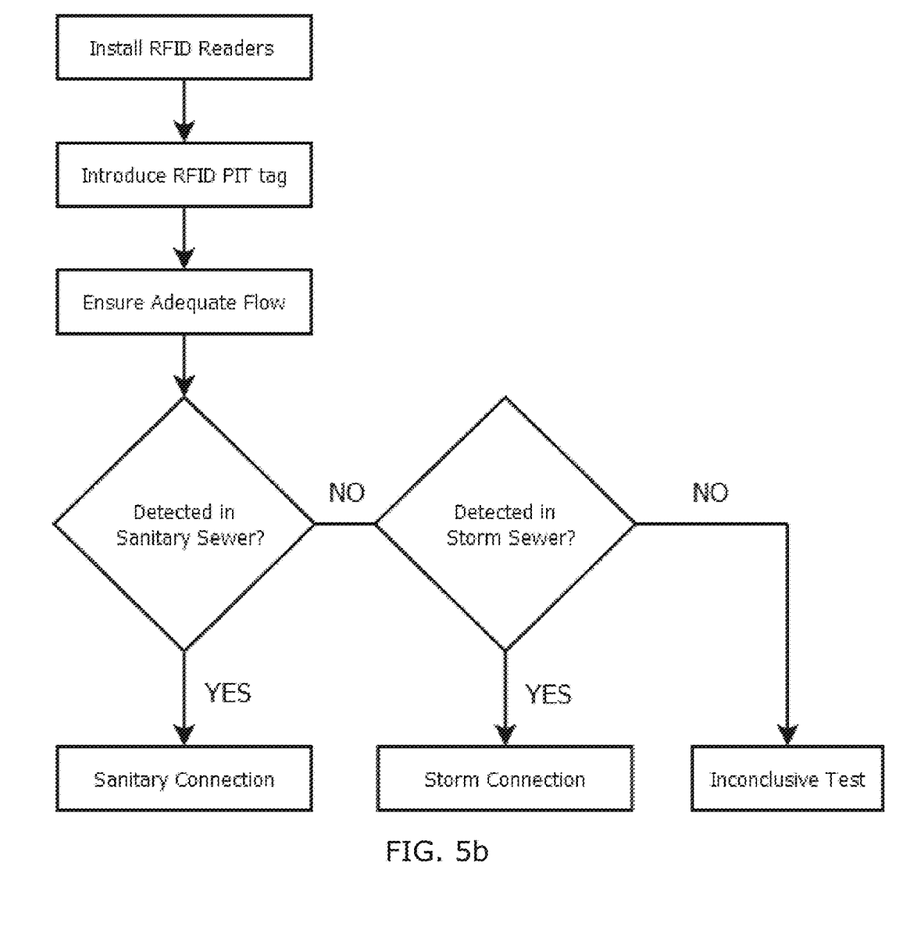
FIG. 5b is a flowchart for the operation of an investigation of connections to sanitary and storm sewer systems as described in one or more embodiments.

FIG. 5b summarizes the operation of a specific embodiment when the system to be tested is either a sanitary sewer (21) or storm sewer (22) By potentially detecting the RFID PIT tag device (8) in either the sanitary sewer (21) system or storm sewer (22) system, the findings of a test may be more conclusive than testing only the sanitary sewer system (21). When testing a sanitary sewer connection, if the RFID PIT tag device (8) is detected in the sanitary sewer (21), this "positive" test result provides strong evidence of a proper connection. Alternatively, if the RFID PIT tag device (8) is detected in the storm sewer, this "positive" test result provides strong evidence of an improper (i.e., "cross-connected") connection. An "inconclusive" test occurs when the RFID PIT tag device is not detected by either of the RFID reader (12) and antenna (10) systems. Similarly, when testing a storm sewer connection, if the RFID PIT tag device (8) is detected in the storm sewer (22), this "positive" test result provides strong evidence of a proper connection. Alternatively, if the RFID PIT tag device (8) is detected in the sanitary sewer, this "positive" test result provides strong evidence of an improper (i.e., "cross-connected") connection. An "inconclusive" test result occurs when the RFID PIT tag device is not detected by either of the RFID reader (12) and antenna (10) systems.

Inconclusive test results can be referred for follow up testing with a different method. Compared to the previous embodiments in which only the sanitary sewer system (21) or storm sewer (22) system is instrumented with and RFID reader (12) and antenna (10) system, this alternative embodiment has the disadvantage of requiring two separate installation steps, twice the equipment requirements, and separate data acquisition and analysis steps.

4.) Alternative Protective Outer Covering Materials for RFID PIT Tag

Although paraffin wax, with or without amendments, is a suitable protective outer covering material for an RFID PIT tag used for tracing sewer connections, under certain test conditions it may be desirable to use alternative materials with different physical properties. Properties such as the buoyancy, density, durability, solubility and dispersibility may be altered by using one or more alternative materials. For example, clay may also be used as a protective outer covering for an RFID PIT tag.

Clay, whether used alone or in combination with various amendments or compounds, also serves as an effective protective outer covering for RFID PIT tags used in sewer tracing applications. Sewers with high base flow rates or very turbulent flow conditions may be tested more effectively with denser materials used as the protective outer covering material. The denser clay protective outer covering material causes the RFID PIT tag device to be entrained and carried along the bottom of the flow within the sewer pipe, which may allow the test device to move more slowly and place it within suitable reading distance of a pass-by or pass-through antenna installed at the invert (bottom elevation) of the sewer pipe.

Although the RFID PIT tags typically used are small and the protective outer covering materials proposed in the preceding embodiments are generally safe and inert, concerns may be raised over the final disposition of the RFID PIT tags and protective outer covering material used in sewer tracing studies. For example, when used in a plumbing system, sewer lateral pipe or sewer system, the RFID PIT tag device may become stuck in a blockage. If the protective outer covering material is soluble in water or otherwise disintegrates or disperses in the presence of water, the blockage will be only temporary. Similarly, if the RFID PIT tags and protective outer covering materials are used in an investigation of storm water sewer systems, the RFID PIT tags and protective outer covering materials may be released into the environment (unless there is a provision for a collection mechanism). Use of clay, gelatin or other alternative protective outer covering materials may allay the concerns over pollution when conducting these types of investigations.

Although for many testing purposes the size of the RFID PIT tag and protective outer covering should be as small as possible while retaining good readability, other size tags and protective coverings may also be used and the description above should not be interpreted to be limiting to the specific materials and sizes described.

5.) Alternative Method for Collection and Interrogation of RFID Tag Devices

The previously described embodiments have the advantage of provisioning an RFID reader and antenna system directly within the system being tested (i.e., on-site, or in-sewer interrogation testing). RFID reader and antenna systems can be configured with a telemetry device to provide real-time data regarding RFID PIT tags that are interrogated within the effective range of the reader and antenna system. However under some testing conditions it may be undesirable or infeasible to install an RFID reader and antenna system in a suitable monitoring location within a sewer system under investigation. Antennas can be difficult to "tune" in order to provide suitable range to interrogate and read RFID PIT tags. Antenna reading range can also be affected by metal objects in the area to be monitored.

Furthermore, RFID reader and antenna systems are relatively expensive and it may not be cost-effective or an efficient use of time to install an RFID reader and antenna system in all testing circumstances, such as when only a single test or small number of tests must be performed. It is also possible that in the course of testing the antenna or reader system may malfunction or be otherwise unavailable and it may be advantageous to continue testing by collecting test devices rather than interrogating and reading the RFID PIT tag identification codes in the sewer system as they pass a monitoring location. Collection of RFID PIT tag devices is also useful as a "back-up" method for validating the results of an investigation.

Therefore in yet another embodiment, it may be desirable to collect the RFID PIT tag device (or devices) released within plumbing systems, sewer lateral pipes and sewer system so that they can be removed from the sewer system (i.e., off-site or out-of-sewer interrogation testing). Once test devices have been collected and removed from the sewer system RFID PIT tag identification codes can be interrogated by an RFID reader and antenna system at a later time, possibly in another more convenient location.

One method of collecting tagged devices in the provision of a mesh basket or bag at an appropriate point within the sewer system under investigation. The mesh size of the collection device must be fine enough to retain the tagged devices yet large enough to allow fine solids and dispersible matter that may be present in the sewer system to pass through. For example, if 13 mm diameter devices are used for investigating a sewer system, a mesh basket or bag having a mesh size of 7 mm will effectively retain the tags while allowing fine solids and dispersible matter that may be present in the sewer system tested to pass through. In general it is desirable for baskets or bags used for RFID PIT tag device collection to be made of a sturdy plastic or metal material and relatively large in capacity in order to accommodate a variety of flow conditions and the possible accumulation of other solids, leaves, debris, and non-dispersible matter such as non-dispersible wipes that may clog the collection device.

When collecting tagged devices in a mesh bag, basket or other collection container for subsequent interrogation outside the sewer system, physical properties of the device or devices can be advantageous for the physical separation of tagged devices from other collected debris. Devices having positive buoyancy (i.e., density <1 $g/cm^3$) can be separated from denser settleable grit and debris by immersing the mesh basket or bag used for device collection in a bucket or other vessel filled with water. Buoyant devices and other floatable material will float to the surface, enabling separation and removal. A solution of water and bleach or other disinfectant agent can be used to also disinfect the devices during the separation process.

6.) Conclusion, Ramifications, and Scope

RFID PIT tag testing is useful to identify whether a plumbing system or sewer lateral pipe is properly connected to a sewer system without the need to actively observe the presence of a visual tracing aid such as dye. RFID PIT tag testing complements other more labor-intensive tracing methods. If and when a plumbing system, sewer lateral pipe, or sewer system is tested with the RFID PIT tag test device and the results of the test are inconclusive due to the RFID PIT tag not being detected at the downstream monitoring point, that plumbing or sewer system can be then subjected to more labor-intensive testing procedures, such as dye testing or camera inspection.

The primary disadvantage of RFID PIT tag technology for sewer tracing, relative to dye testing, is that the test device must be able to be conveyed unimpeded along the flow path. RFID PIT tag testing is useful for screening purposes but may not be able to identify all sewer system defects. Pipe defects such as cracks, collapsed pipe segments, and misaligned joints; as well as obstructions including roots, grease, sediment or other debris may be present within a plumbing system, sewer lateral pipe, or sewer system. These defects and obstructions may allow for the free movement of water and dissolved dye to pass through in a dye test but may not allow the test device to pass through. RFID PIT tag testing is useful for screening purposes and will effectively identify fully cross-connected sewer laterals but may not be able to identify all sewer system defects.

Toilets are designed for disposal of solid waste and generally have 80 mm or 100 mm diameter (nominal pipe sizes, equivalent to three inch and four inch nominal pipe sizes, respectively) waste drain pipes. It should therefore not be problematic for RFID PIT tag devices having an outer diameter of 13 mm to pass through toilets or toilet waste drain pipes. However, other fixtures within a house plumbing system typically have 32 mm or 40 mm (nominal pipe sizes equivalent to 1.25 or 1.5 inch nominal pipe sizes) waste drain piping. Furthermore, in addition to the smaller waste drain pipe diameter, most other types of fixtures are not specifically designed to accommodate solids. Fixtures other than toilets may be equipped with traps, plunger mechanisms, fixed strainers or other features that effectively prevent the disposal of larger objects, such as the test devices described in the preceding embodiments.

In the preceding described embodiments specific compositions and methods of sewer system investigation with RFID PIT tags have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of determining whether a building plumbing system is connected to a sewer system, the method comprising the steps of:
   (a) installing a first radio frequency antenna in a first fluid pipe in the sewer system;
   (a1) prior to step (b), installing a second radio frequency antenna in a second fluid pipe;
   (b) providing a first reader configured to receive an electronic signal from the first radio frequency antenna;
   (b1) prior to step (c), providing a second reader configured to receive an electronic signal from the second radio frequency antenna;
   (c) introducing a radio frequency identification ("RFID") device into the building plumbing system at an insertion location;
   (d) ensuring sufficient fluid flow into the building plumbing system to flow the RFID device downstream from the insertion location;
   (e) the first radio frequency antenna receiving an RFID electronic signal from the RFID device when the RFID device flows past the first radio frequency antenna; and
   (e1) after step (d), the second radio frequency antenna receiving the RFID electronic signal from the RFID device when the RFID device flows past the second radio frequency antenna;
   (f) the first radio frequency antenna transmitting a first radio frequency antenna electronic signal containing identification code data to the first reader when the RFID device flows past the first radio frequency antenna and determining that the building plumbing system is connected to the first fluid pipe; and
   (f1) after step (e1), the second radio frequency antenna transmitting a second radio frequency antenna electronic signal to the second reader and determining that the building plumbing system is connected to the second fluid pipe.

2. The method according to claim 1, further comprising, after step (d), (d1) visually confirming fluid flow through the fluid pipe system.

3. The method according to claim 1, wherein step (f) further comprises saving the identification code data in the first radio frequency antenna electronic signal in the first reader.

4. The method according to claim 1, wherein the first reader and the second reader are the same reader.

5. The method according to claim 1, further comprising the step of:
   (g) if the RFID device does not flow past either the first radio frequency antenna or the second radio frequency antenna, concluding the determination with an inconclusive result.

6. The method according to claim 1, wherein step (c) comprises providing the RFID device having an RFID Passive Integrated Transponder ("PIT") tag.

7. The method according to claim 6, wherein step (c) further comprises providing the RFID device having an outer covering surrounding the RFID PIT tag.

8. The method according to claim 7, wherein step (c) further comprises providing the RFID device having a density of not more than 1 gram per cubic centimeter.

9. The method according to claim 7, wherein step (c) further comprises providing the outer covering from a hydrophobic material.

10. The method according to claim 7, wherein step (c) further comprises providing the outer covering from a water soluble material.

11. The method according to claim 1, wherein step (b) comprises connecting the first radio frequency antenna to the reader with a cable.

12. A method of determining if a fluid pipe system is connected to a sanitary sewer system or to a storm sewer system, the method comprising the steps of:
   (a) installing a first radio frequency antenna in a sanitary sewer system;
   (b) installing a second radio frequency antenna in a storm sewer system;
   (c) providing a first reader configured to receive a first electronic signal from the first radio frequency antenna and a second reader configured to receive a second electronic signal from the second radio frequency antenna;

(d) introducing an RFID device into the fluid pipe system at an insertion location and allowing the RFID device to flow through the fluid pipe system;

(e) ensuring sufficient fluid flow into the fluid pipe system to flow the RFID device downstream through the fluid pipe system;

(f) the first radio frequency antenna receiving an electronic signal from the RFID device when the RFID device flows past the first radio frequency antenna and then the first radio frequency antenna transmitting a first radio frequency antenna signal to the first reader, thereby determining that the fluid pipe system is connected to the sanitary sewer system;

(f1) the second radio frequency antenna receiving an electronic signal from the RFID device when the RFID device flows past the second radio frequency antenna and then the second radio frequency antenna transmitting a second radio frequency antenna signal to the second reader, thereby concluding that the fluid pipe system is connected to the storm sewer system; and (f2) concluding a result as inconclusive when the RFID device flows past neither the first radio frequency antenna nor the second radio frequency antenna.

13. The method according to claim 12, wherein step (f) further comprises storing identification code information from the electronic signal for later retrieval.

14. The method according to claim 12, wherein step (b) comprises installing the second radio frequency antenna sufficiently far from the first radio frequency antenna to prevent false positive readings from either the first radio frequency antenna or the second radio frequency antenna.

\* \* \* \* \*